United States Patent
Nakamura

[11] Patent Number: 5,893,096
[45] Date of Patent: Apr. 6, 1999

[54] INFORMATION COLLECTION SYSTEM EQUIPPED WITH TRANSFER MECHANISM

[75] Inventor: Satoshi Nakamura, Tokyo, Japan

[73] Assignee: Mitsubishi Denki Kabushiki Kaisha, Tokyo, Japan

[21] Appl. No.: 914,937

[22] Filed: Aug. 20, 1997

[30] Foreign Application Priority Data

Jan. 27, 1997 [JP] Japan .................................. 9-012142

[51] Int. Cl.$^6$ .................................................. G06F 17/30
[52] U.S. Cl. ..................... 707/10; 345/200.59; 345/680; 455/453; 340/568
[58] Field of Search ................. 705/1, 401; 395/200.59, 395/640, 683; 455/453, 454, 456; 340/568; 707/10

[56] References Cited

U.S. PATENT DOCUMENTS

| | | | |
|---|---|---|---|
| 5,245,532 | 9/1993 | Mourier | 364/400 |
| 5,424,724 | 6/1995 | Williams et al. | 340/825.03 |
| 5,603,031 | 2/1997 | White et al. | 395/683 |
| 5,644,727 | 7/1997 | Atkins | 705/40 |
| 5,666,648 | 9/1997 | Stuart | 370/21 |
| 5,678,175 | 10/1997 | Stuart et al. | 455/13.1 |
| 5,696,900 | 12/1997 | Nishigaya et a.l | 395/200.59 |
| 5,737,706 | 4/1998 | Seazholtz et al. | 455/456 |
| 5,748,084 | 5/1998 | Isikoff | 340/568 |
| 5,761,621 | 6/1998 | Sainton | 455/453 |
| 5,794,151 | 8/1998 | McDonald et al. | 455/454 |
| 5,796,394 | 8/1998 | Wicks et al. | 345/329 |

Primary Examiner—Paul R. Lintz

[57] ABSTRACT

The prime object of the present invention is to achieve an easy-to-use information collection system equipped with transfer mechanism, that can lower the amount of traffic on network and minimizes the operation at terminal. Main features of the present invention are the terminal connection unit provided with a terminal agent transmitting/receiving module, and the server provided with a server agent transmitting/receiving module. When an electronic message is sent from a radio or wired terminal via radio or wired line, the terminal agent transmitting/receiving module reads the specific area in the electronic message and transfers it to a predetermined server. The server agent transmitting/receiving module then receives and reads the message, and transfers it to a corresponding processing module if the message is addressed to it's own server, writes the processing result in the message and then forwards the message to the next address indicated in the message. In addition, the specific area in the electronic message is created upon request at the time of database retrieval, and the server also includes a database and a procedure language interpreting module unique to each database.

6 Claims, 12 Drawing Sheets

INTERMEDIATE LANGUAGE (EX.)

```
...
¥DPRICELIST
¥SNAME
¥0
...
```

SQL TEXT (EX.)

```
...
SELECT NAME
FROM PRICELIST
...
```

Fig.6

INTERMEDIATE LANGUAGE (EX.)

```
...
¥DPRICELIST
¥SNAME
¥0
...
```

NON. SQL DATABASE TEXT (EX.)

```
...
TABLE T1 = PRICELIST
FIELD F1 = NAME
SELECT S1 = F1 FROM T1
OUTPUT S1
...
```

INFORMATION COLLECTION SYSTEM EQUIPPED WITH TRANSFER MECHANISM

FIELD OF THE INVENTION

The present invention relates to a system for collecting necessary information involving minimum input from a terminal.

DESCRIPTION OF THE RELATED ART

More computer systems are now linked to network, and distribution systems such as client server system had come into being use. Such distribution system can be made up of number of servers and mail servers having differently-formatted databases, and sometimes a single user can occupy the number of servers.

When a system is configured on a network by means of distribution, a large amount of data passes through the network. The configuration of the distribution systems not only adopts the high-speed Local Area Network (LAN) but also the low-speed telephone and radio lines that are prone to outside influences.

Figure 12:
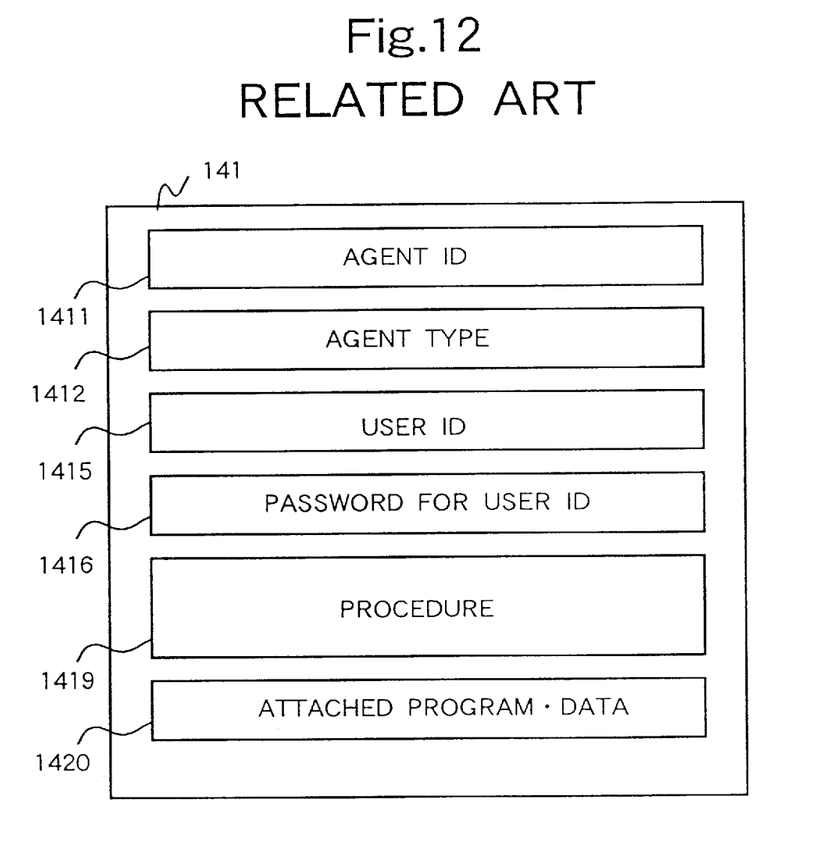
FIG. 12 shows the conventional agent configuration.

As one of the effective methods of processing a large amount of data on the distributed system, there is a concept known as network agent. The detail specification of the agent description language called "telescript", developed by the General Magic of the United States of America, is mentioned in the specification of Japanese Unexamined Patent Application HEI07-182174 corresponding U.S. patent application Ser. No. 08/090.521, filed on Jul. 8, 1993, now U.S. Pat. No. 5,603,031. The agent takes a form of processing in which it transmits an object shown in FIG. 12 (with attached program·data 1420 and procedure 1419) to a computer, then the object is processed in the computer. The term "agent" strictly refers to the prementioned form of processing and the object, and this is not same as the so-called agent used in a general sense or the software agent carrying out a particular purpose in a broader sense. The network agent is a program that executes tasks for the users of computer systems on the network using resources and data available in an intra-network computer system.

In the conventional distribution system, quite often, retrieval of a number of differently-formatted databases had to be performed separately from a terminal. Similarly, when using a multiple number of mail servers, transmitting and receiving of E-mail (Electronic-mail) had to be carried out separately for each mail server. The database retrievals or the E-mail transmissions conducted separately can result in heavy traffic because a large amount of data is passing through the network. This is especially so when the network comprises of low-speed lines such as telephone or radio line.

To receive E-mail at a terminal, a program for displaying binary mail should be installed to start with, in order to read the E-mail composed of, or containing binary data which is waiting at the mail server.

When an unlawful access to the distribution system was made from a missing or stolen terminal that is no longer controllable by a lawful owner, information contained such as user ID and password can be stolen from such terminal, or, the user ID and password may accidentally be sent away together with such function as automatic login. Furthermore, a location of terminal making unlawful access to the distribution system was difficult to trace.

PROBLEMS TO BE SOLVED BY THE INVENTION

Under the conventional network system configuration described above, the database retrievals had to be performed separately depending on the language or the system of database in use, also it had to access the mail server each time checking for in-coming mail. All these has led to a heavy traffic on the network.

Moreover, the conventional technique had problem in receiving binary mail, and a display program had to be installed on the terminal so that the binary mail could be displayed on E-mail. The problem also lay in the security which was seen to be inadequate.

The present invention aims to overcome previously described problems. The prime objective of the present invention is to achieve an easy-to-use information collection system equipped with transfer mechanism, that involves less workload at the terminal, contributing to lower the traffic of the network.

SUMMARY OF THE INVENTION

An information collection system equipped with transfer mechanism may comprise a terminal connection o unit including a terminal agent transmitting/receiving module for reading a specific area in an electronic message sent from a radio terminal via radio line or a wired terminal, and for transmitting the electronic message to one of specific servers specified in the electronic message as a circulating server, and a server including a server agent transmitting/receiving module for receiving the electronic message from a terminal connection unit, transferring the electronic message to a processing module when a server is one of the circulating servers, for writing a processing result in the electronic message, and for transmitting the electronic message to a next one of circulating servers written in the electronic message, and the processing module for converting the transferred electronic message from the server agent transmitting/receiving module into a language used in the specified server and for processing a converted electronic message.

The information collection system equipped with transfer mechanism may include the specific area in the electronic message including a database retrieval request, wherein the processing module of the server may include a procedure language interpreting module unique to a database and the database retrieved in an interpreted language, and wherein the server may write a result of database retrieval in the electronic message and transmits the electronic message to the next one of circulating servers.

The information collection system equipped with transfer mechanism, wherein the specific area in the electronic message may include an E-mail reception transfer request, wherein the processing module of the server may include a procedure interpreting module for an mail server and the mail server for transmitting the E-mail specified in the interpreted electronic message, and wherein the server may write the E-mail in the electronic message and transmitting to the next one of circulating servers.

The information collection system equipped with transfer mechanism may further comprise a binary mail display program providing server, to which the E-mail is sent in case when the server agent transmitting/receiving module may judge the E-mail is the binary mail and is not the type that can be displayed on radio terminal, and wherein the binary mail display program providing server may add a corresponding binary mail display program to the electronic message and may transmit to the next one of circulating servers.

The information collection system equipped with transfer mechanism, wherein the server agent transmitting/receiving module, upon receiving the E-mail to the radio terminal of the server, may send the electronic message including an E-mail reception notification agent for notifying the reception to a corresponding terminal connection unit, and wherein the agent transmitting/receiving module of the terminal connection unit, upon receiving the electronic message including the E-mail reception notification agent, may notify the reception of a corresponding E-mail to the radio terminal when the line is connected with the radio terminal.

The information collection system equipped with transfer mechanism may further comprise a radio terminal or a wired terminal including a location information detection module or a location information set module which may add the location information detected or set in the specific area of the electronic message, and wherein the server may set restricted conditions corresponding to the location information and may perform processing determined by the location information received from the terminal.

BRIEF DESCRIPTION OF THE DRAWINGS

The invention will best be understood by reference to the following detailed description of an illustrative embodiment widen read in conjunction with the accompanying drawings, wherein.

PREFERRED EMBODIMENTS OF THE INVENTION

Embodiment 1.

An embodiment for achieving the information collection system equipped with transfer mechanism of the present invention will be set forth below with reference to Figures.

Figure 1:
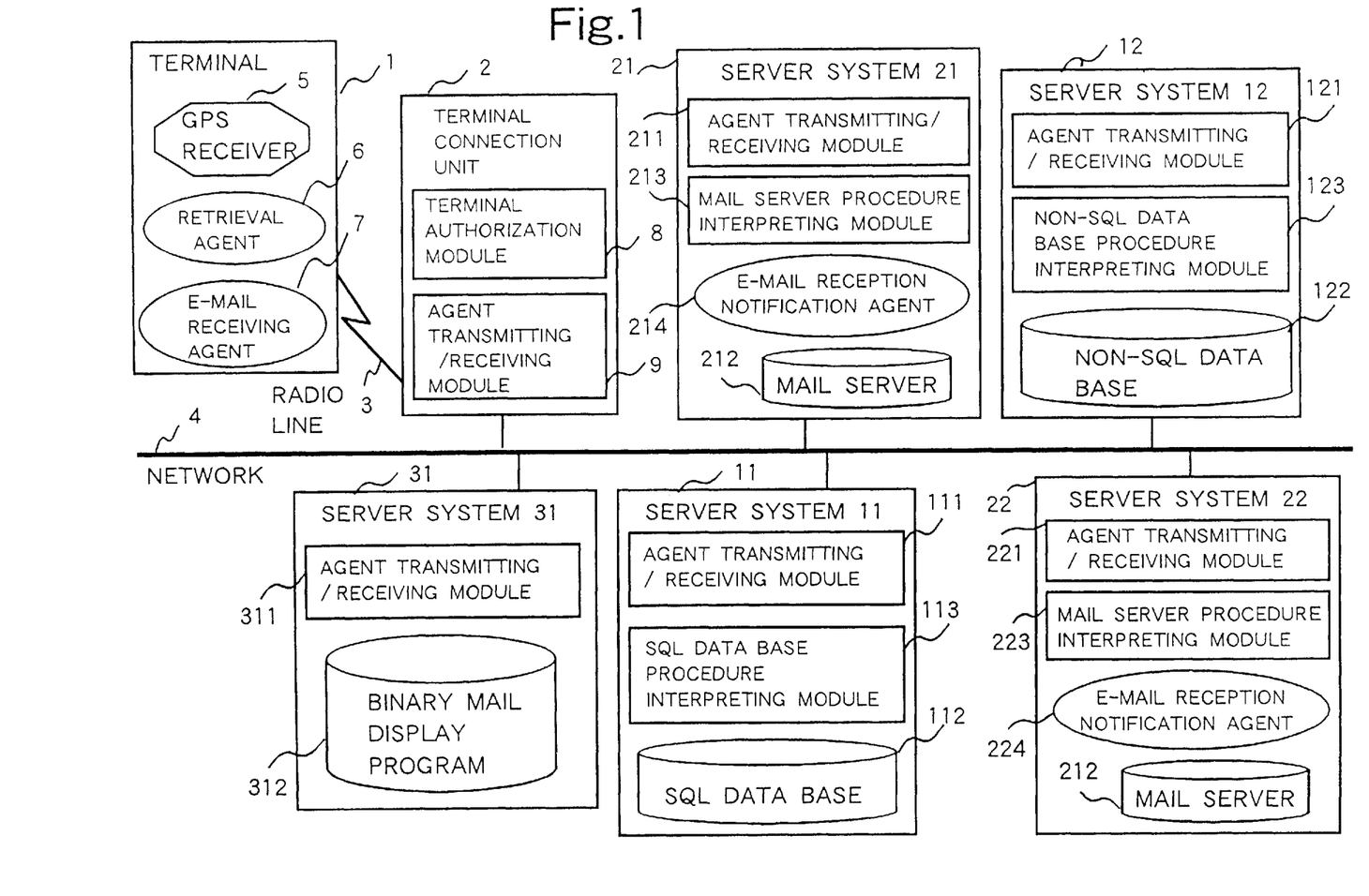
FIG. 1 is a model of embodiment for the information collection system equipped with transfer mechanism.

A configuration of the information collection system equipped with transfer mechanism of Embodiment 1 is shown in FIG. 1.

Terminal 1 in FIG. 1 is a system operated by a user, composed of the followings: Global Positioning System (GPS) receiver 5 that locates current positions based on radio waves transmitted from artificial satellite; retrieval agent 6 (electronic message written in the programming type of format) that circulates server systems to retrieve a database; and E-mail receiving agent 7 that circulates server systems to receive an E-mail. The terminal connection unit 2 includes a terminal authorization module 8 and a terminal agent transmitting/receiving module 9. The terminal 1 and the terminal connection unit 2 are connected with a radio line 3.

Server system 11 is a server system providing Structured Query Language (SQL) database function which is made using structured query language. The server system 11 consists of the followings: server agent transmitting/receiving module 111; an SQL database 112; and SQL database procedure interpreting module 113 as a procedure language interpreting module for the own database. Server system 12 also provides database function but differs from the server system 11 in a way that it provides function of non-SQL database. The server system 12 includes the followings: server agent transmitting/receiving module 121; non-SQL database 122; and non-SQL database procedure interpreting module 123 as procedure language interpreting module for the own database.

Server system 21 provides mail server functions, that includes the followings: server agent transmitting/receiving module 211; mail server 212; mail server procedure interpreting module 213; and E-mail reception notification agent 214. Server system 22 also provides mail server function that includes the followings: server agent transmitting/receiving module 221; mail server 222; mail server procedure interpreting module 223; and E-mail reception notification agent 224. The server system 31 provides programs for terminal that includes the followings: server agent transmitting/receiving module 311, and binary mail display program 312 for displaying the binary mail on the terminal.

Network 4 connects the terminal connection unit 2 with the server systems 11, 12, 21, 22, and 31.

Figure 2:
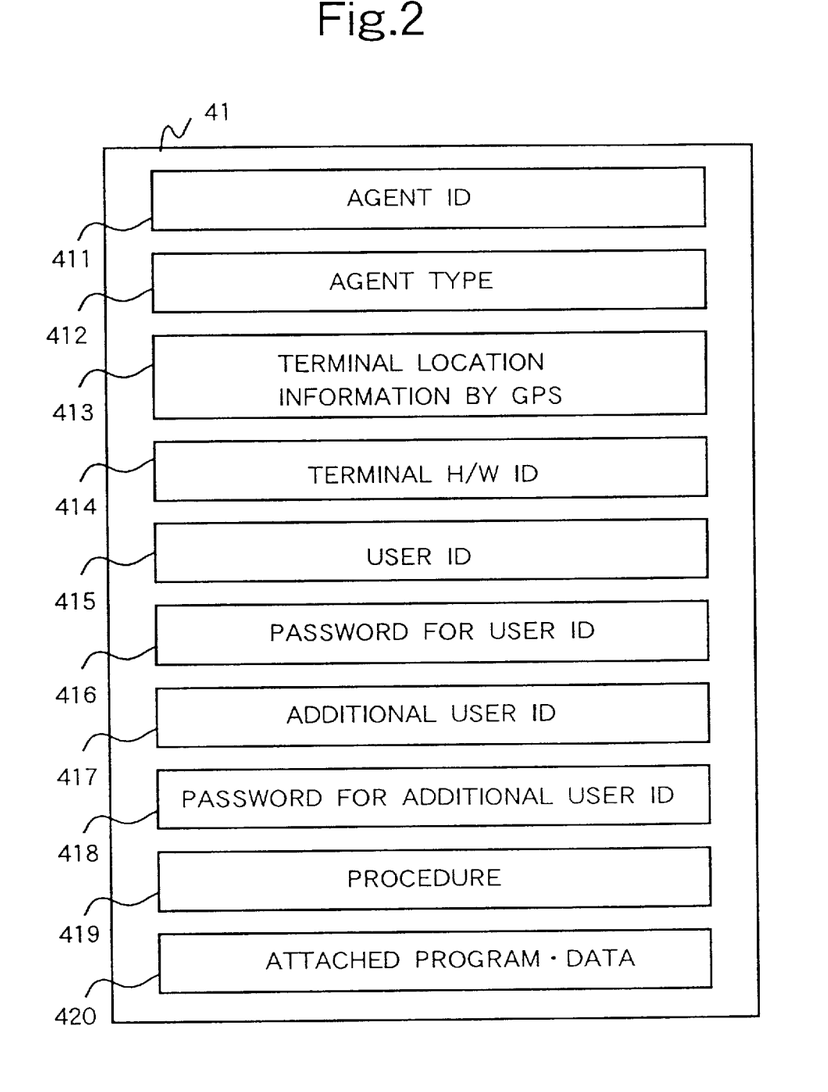
FIG. 2 is an agent configuration of FIG. 1.
Figure 3:
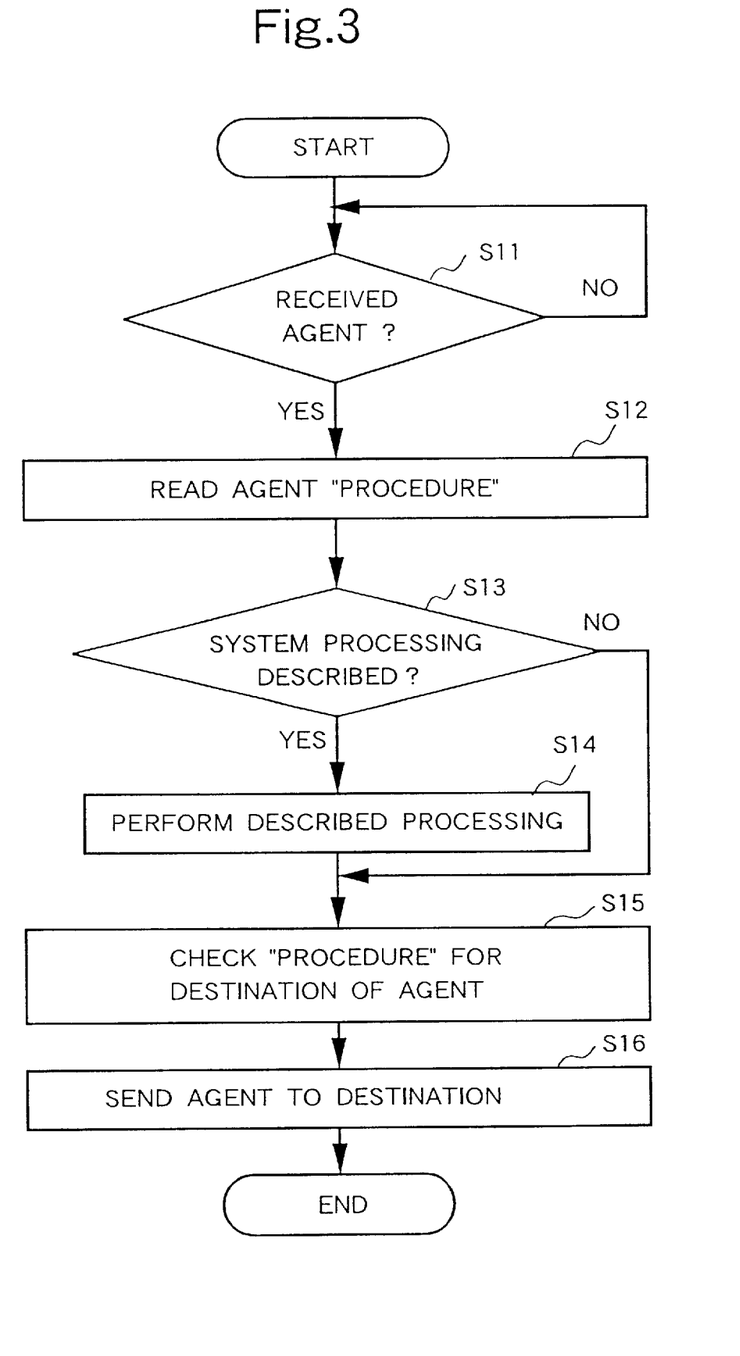
FIG. 3 is a flowchart of processing at a terminal agent transmitting/receiving module of FIG. 1 upon receiving an agent.

FIG. 2 shows a configuration of the agent for network agent system of FIG. 1. FIG. 3 outlines an algorithm for the operation of the agent transmitting/receiving module 9 at the terminal connection unit 2.

Figure 4:
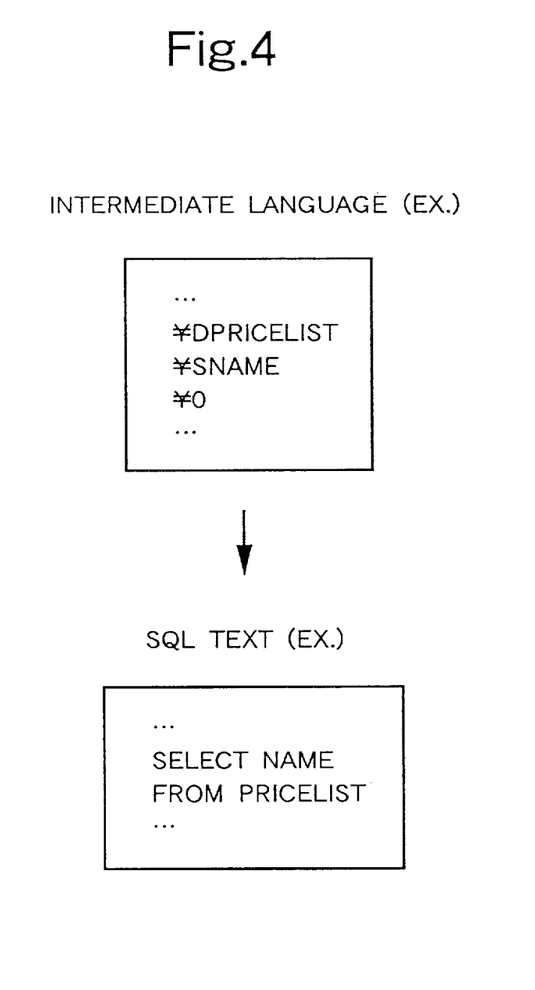
FIG. 4 is an example of showing a conversion of retrieval condition from the intermediate language into the SQL texts by the SQL database procedure interpreting module of FIG. 1.
Figure 5:
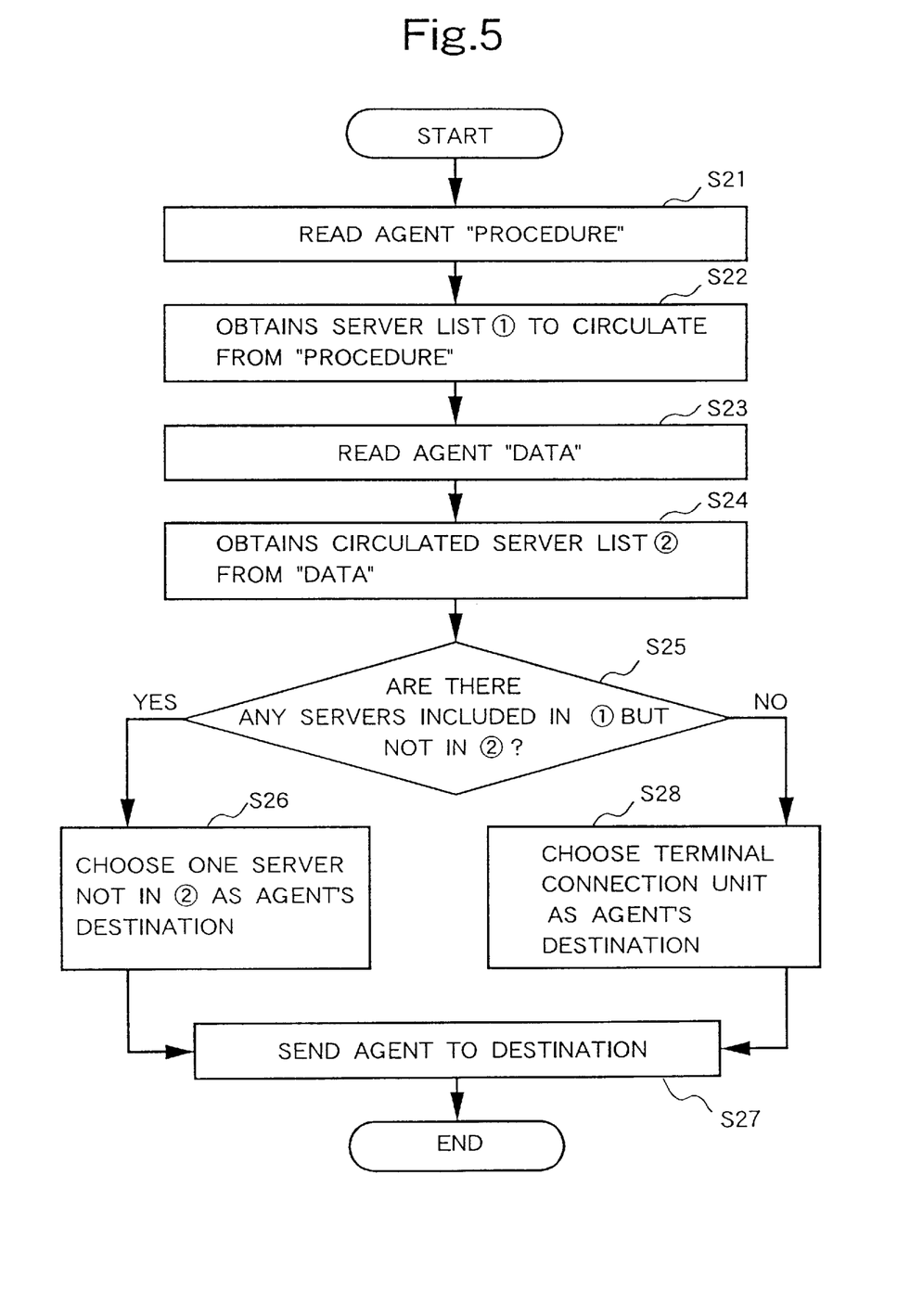
FIG. 5 is a flowchart of processing at transmission of an agent by the server agent transmitting/receiving module of FIG. 1.
Figure 6:
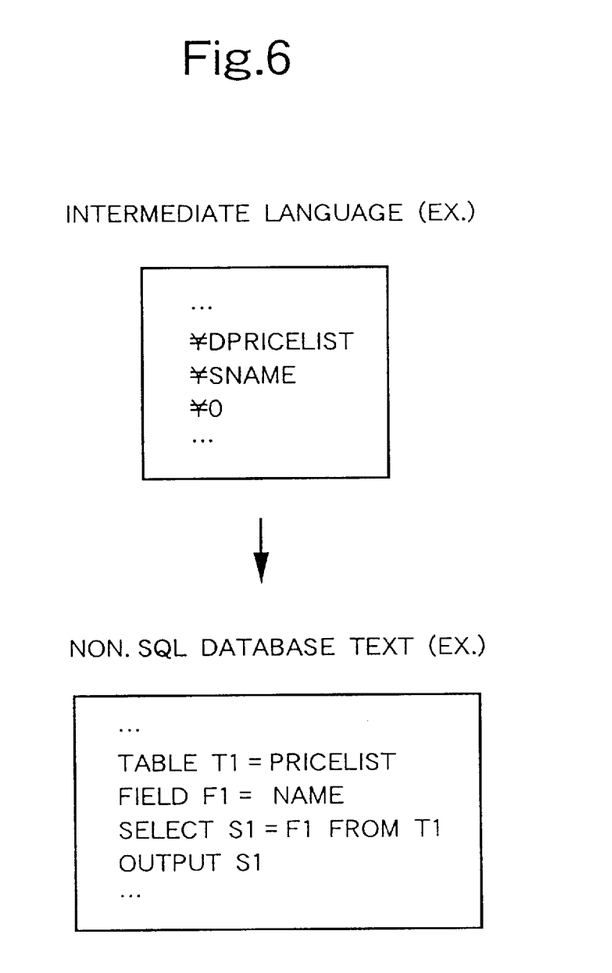
FIG. 6 is an example of showing a conversion of intermediate language into the non-SQL database retrieval texts by the non-SQL database procedure interpreting module of FIG. 1.

FIG. 4 is an example of language interpretation by the SQL database procedure interpreting module 113 for the server system 11. FIG. 5 outlines an algorithm for the operation of the server agent transmitting/receiving module 111 at the server system 11. FIG. 6 is an example of the language interpretation by the non-SQL database procedure interpreting module 123 at the server system 12.

As in FIG. 2, the agent 41 includes the followings: agent ID 411 for identifying the agent; agent type 412; GPS terminal location information 413 showing the location of a terminal obtained from the GPS; terminal hardware ID 414 for identifying the terminal main body; user ID 415 for identifying a terminal user; password 416 of the user ID 415; additional user ID 417 different from the user ID 415; password 418 of the additional user ID 417, procedure 419 performed by the agent 41 at the server system; and data 420, a program attached to the agent as a result of the processing at the server system. The procedure 419 is written in the intermediate language so it can be interpreted by any of the procedure interpreting modules provided at each server system.

In a case when the agent 41 is comprising the retrieval agent 6, procedures for retrieving a database such as a name of the database to retrieve and the conditions for a retrieval are written at the procedure 419.

In a case when the agent 41 is comprising the E-mail receiving agent 7, information on a name of the mail server by which to receive mail and the type of binary mail that are readable at terminal 1 are written at the procedure 419.

It is also possible to instruct what user ID to use at the procedure 419. Depending on the server system in access, it is possible that the instruction to use additional user ID 417 instead of user ID 415 is written in the procedure 419.

The modules shown in FIG. 1 and operations at each part are described next.

A case of retrieval is explained first. A retriever of database performs the database retrieval by operation at the terminal 1. When the retriever enters into the retrieval conditions at the terminal 1, then executes the retrieval operation, the ID for identifying an agent is set at the agent ID 411 of the retrieval agent 6. A value indicating the retrieval agent is set at the agent type 412. Information on terminal location at the time of retrieval execution is set at the terminal location information 413 by the GPS. A unique terminal ID is set at the terminal H/W ID 414. Then, the user ID 415, the password 416, and the retrieval conditions are set at the procedure 419.

In this embodiment, it is assumed that the database is retrieved after circulating through the server system 11 and the server system 12, as conditions for a retrieval. The additional user ID 417 and the password 418 can be set as required.

When necessary values and procedures are set at the retrieval agent 6, the radio line 3 is connected, and the retrieval agent 6 having the retrieval conditions is transmitted to the terminal connection unit 2.

Referring to the algorithm in FIG. 3, when the agent transmitting/receiving module 9 recognizes a reception of the agent at step 11 (hereinafter, simply S11), it reads the procedure 419 of the retrieval agent 6 at S12. As the procedure 419 reads the first circulating point of retrieval agent 6 to be the server system 11 at S15, at S16 the retrieval agent 6 is transmitted to the server system 11.

When the retrieval agent 6 arrives at the server system 11 by way of the network 4, the agent transmitting/receiving module 111 processes the database retrieval procedure as shown in the algorithm of FIG. 5. When the agent transmitting/receiving module 111 receives the agent, it obtains the retrieval conditions of a database, by reading the procedure 419 of the retrieval agent 6 at S21. Then, the agent transmitting/receiving module 111 passes the retrieval conditions written in intermediate language at procedure 419 to the SQL database procedure interpreting module 113, to carry out the described processing. The SQL database procedure interpreting module 113 converts the intermediate language of retrieval conditions to a format retrievable by the SQL database 112, as exemplified in the FIG. 4. Based on the conversion the obtained SQL text executes the retrieval of SQL database 112. A result of the retrieval execution is added to the retrieval agent 6 as data 420.

After completing the retrieval at server system 11, agent transmitting/receiving module 111 designates the retrieval agent 6 to the next circulating area, the server system 12. First, at S22, the procedure 419 is read to obtain the server in which the agent needs to circulate. Next, at S23, data 420 is read. The data 420 consists of a result of the database retrieval so that it is possible to obtain a circulated server from the data 420 (S24). For example, the S26 checks a difference in the server information obtained from procedure 419 with data 420 to choose the next circulating server, and transmits the retrieving agent 6 at S27.

When the retrieval agent 6 reaches the server system 12, the operation is performed in the same manner as the server system 11. That is, the agent transmitting/receiving module 121 reads the procedure 419 of the retrieval agent 6 at S12 to obtain the database retrieval conditions. The retrieval conditions written in intermediate language at procedure 419 are converted into the format retrievable by the non-SQL database 122, as exemplified in the FIG. 6, and executes the retrieval of non-SQL database 122. A result of the retrieval execution is added to the retrieval agent 6 as data 420.

After completing the retrieval, agent transmitting/receiving module 121, using the algorithm of FIG. 5 (if it was the last retrieval server, transmits the retrieval agent 6 to the terminal connection unit 2. Similar to the case for agent transmitting/receiving module 111, the procedure 419 and the data 420 of agent are read at S22 through S25 to recognize the servers to be circulated and the information on the circulated servers. The retrieval agent 6 that has completed the retrieval will recognize all servers have been circulated, from a difference in server information. Therefore, at S28, the retrieval agent 6 is transmitted to the terminal connection unit 2 to return to terminal 1.

Terminal connection unit 2 connects the terminal 1 with the radio line 3. Then, the retrieval agent 6 returns to the terminal 1, thereupon displays the retrieval result which is added to the agent as data 420.

In this way, a single entry of retrieval conditions at terminal 1 readily facilitates retrieval from a multiple number of server systems.

Other than radio terminal, the terminal connection unit can also be connected to wired terminal, and an entry is made at the wired terminal is same as those made at the radio terminal.

Embodiment 2.

A case of the E-mail reception is explained next. The system configuration for this case is same as FIG. 1. However, the agent 41 in FIG. 2 is the E-mail receiving agent 7.

Figure 7:
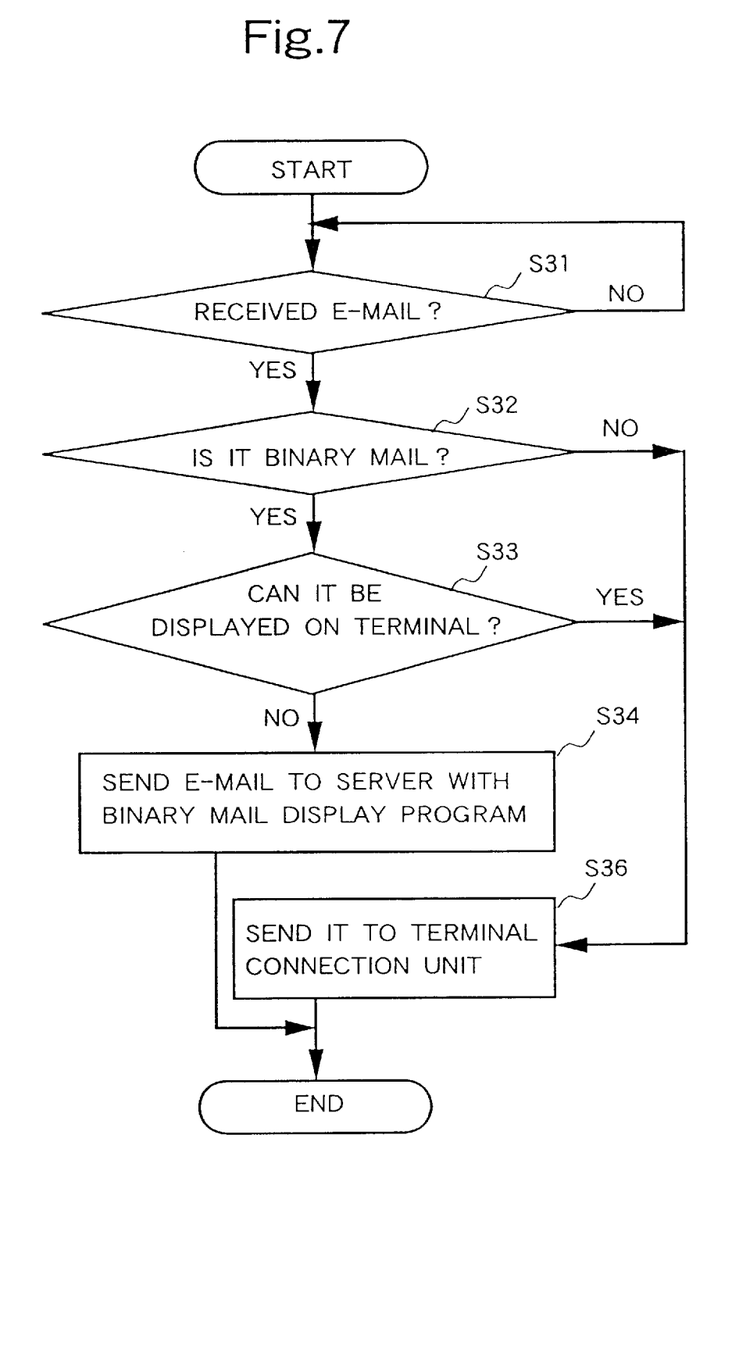
FIG. 7 is a flowchart of processing of receiving E-mail by the server agent transmitting/receiving module of FIG. 1.
Figure 8:
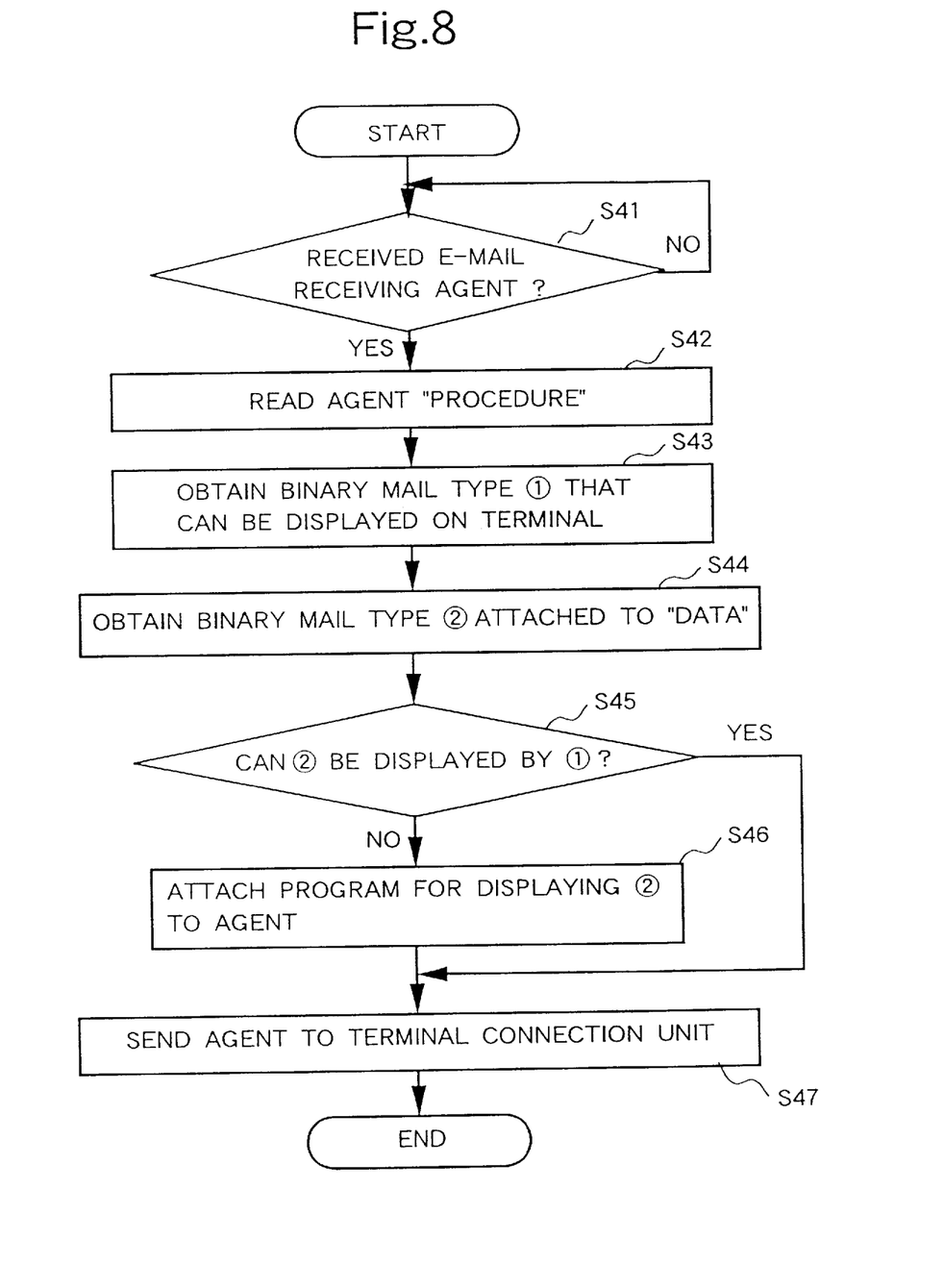
FIG. 8 is a flowchart showing details of processing of server agent transmitting/transmitting module 311 attaching a binary mail display program to the agent.

FIG. 7 is a flowchart for the operation performed by the server agent transmitting/receiving modules 211 and 221 at the servers 21 and 22. FIG. 8 is a flowchart for the operation performed by the server agent transmitting/receiving module 311 at the server 31.

In receiving E-mail from a multiple number of server systems, a receiver of the mail performs receiving operation of E-mail at the terminal 1. During the receiving operation, being similar to the case of retrieving a database, various values are set against the E-mail receiving agent 7. That is, an ID for identifying an agent is set at the agent ID 411. A value indicating the E-mail receiving agent is set at the agent type 412. Information on the terminal location at the time of E-mail receiving operation is set by GPS at the terminal location information 413. A unique terminal ID is set at the terminal H/W ID 414. Then, the user ID 415, the password 416, the name of a mail server in which to receive the mail, and the type of binary mail that can be displayed on the terminal 1 are set at the procedure 419.

Here, mail are assumed to be received from the mail servers 21 and 22.

When necessary values and procedures are set for the E-mail receiving agent 7, the radio line 3 is connected. Then, E-mail receiving agent 7 containing the user information about the receiver and the information about the type of binary mail that can be displayed at the terminal are transmitted to the terminal connection unit 2.

At terminal connection unit 2, the agent transmitting/receiving module 9 transfers E-mail receiving agent 7 to the server system 21 linked via network 4, based on the algorithm for S11 and S16 of FIG. 3.

When E-mail receiving agent 7 arrives at the server system 21, agent transmitting/receiving module 211 reads the procedure 419 contained in the E-mail receiving agent 7 at S21 of FIG. 5. Mail server procedure interpreting module 213 reads either the specified user ID 415 or the additional user ID 417, and adds an already received E-mail to the attached program·data area 420.

After the received mail is added to the E-mail receiving agent 7 by the agent transmitting/receiving module 211 of the server system 21 at S27 of FIG. 5, E-mail receiving agent 7 is sent to server system 22.

When the E-mail receiving agent 7 arrives at the server system 22, the E-mail is added as data 420 in the same operation as the server system 21. Then, at S28 of FIG. 5, agent transmitting/receiving module 221 sends the E-mail receiving agent 7 with attached E-mail to terminal connection unit 2.

The terminal connection unit 2 connects terminal 1 with radio line 3, to transfer the E-mail receiving agent 7 to the terminal 1. Thereupon the terminal 1 displays the E-mail added to the agent as data 420 on the terminal 1.

In this way, by performing a single E-mail receiving operation at the terminal 1, E-mail can easily be received from a multiple number of server systems. This holds true for the wired terminal as well.

When the E-mail receiving agent 7 arrives at the server system 21 or 22, server agent transmitting/receiving module 211 or 221 implements processing S31 and S34 as shown in the flowchart of FIG. 7. At S32, when the E-mail received at S31 was a binary mail, and at S33, if a type of the binary mail does not match any of the binary mail display types (described in procedure 419 of E-mail receiving agent 7) available at the terminal 1, the E-mail receiving agent 7 is sent to the server system 31 which provides with the binary mail display program 312 before the agent is transmitted to terminal connection unit 2 by the server agent transmitting/receiving module.

For instance, when the binary mail that can be displayed at terminal 1 is an image data created in Graphics Interchange Format (GIF), and when the received binary mail is the GIF image data, E-mail receiving agent 7 is directly sent to the terminal 1.

However, when the received binary mail was an image data in the Joint Photographic Coding Experts Group (JPEG) format, the binary mail cannot be displayed directly at the terminal 1. Therefore, in order to display the JPEG image data on terminal 1, agent transmitting/receiving module sends the E-mail receiving agent 7 to the server system 31 which acts as a server to supply the binary mail display program.

At the server system 31, agent transmitting/receiving module 311 checks the E-mail receiving agent 7 for an information on the type of binary mail displayable at the terminal, and checks the type of received binary mail based on an algorithm of FIG. 8. First, at S42, the agent transmitting/receiving module 311 reads the procedure 419 of E-mail receiving agent 7, and obtains information on the type of binary mail that can be displayed on the terminal at S43. Next, at S44, the agent transmitting/receiving module 311 checks for the type of binary mail attached at data 420. After confirming that the binary mail does not match with those that can be displayed at the terminal, at S46 the agent transmitting/receiving module 311 attaches a program to the data 420 in order to display binary mail. When the received binary mail contains the JPEG image data, and if the JPEG was not included in the type of binary mail that are available for displaying at the terminal, a JPEG display program 312, which is required for displaying the JPEG binary data on the terminal, will be sent with the E-mail receiving agent 7 as an attachment of the attached program·data 420.

At S47, the E-mail receiving agent 7 with the attached binary mail display program is sent to the terminal connection unit 2 by the agent transmitting/receiving module 311. The terminal connection unit 2 sends it to terminal 1. At the terminal the display program 312 enables to display the received mail, including binary mail.

As such, even if the terminal has no binary mail display program installed, the display program will be sent from the binary mail display program supply server 31 to the terminal 1 where the binary mail should be displayed.

Embodiment 3.

In conjunction with the embodiments described above, a system that facilitates easy-to-use terminal operation and strengthens safety is explained below.

The system configuration is same as the one shown in FIG. 1.

A notification system of E-mail reception is explained at first. Arrival of E-mail addressed to radio terminal is informed to the terminal connection unit. Arrived E-mail is kept waiting until the radio terminal is connected to the terminal connection unit, and when the connection is made the arrival of E-mail addressed to the radio terminal will be notified to the terminal from the terminal connection unit.

Figure 9:
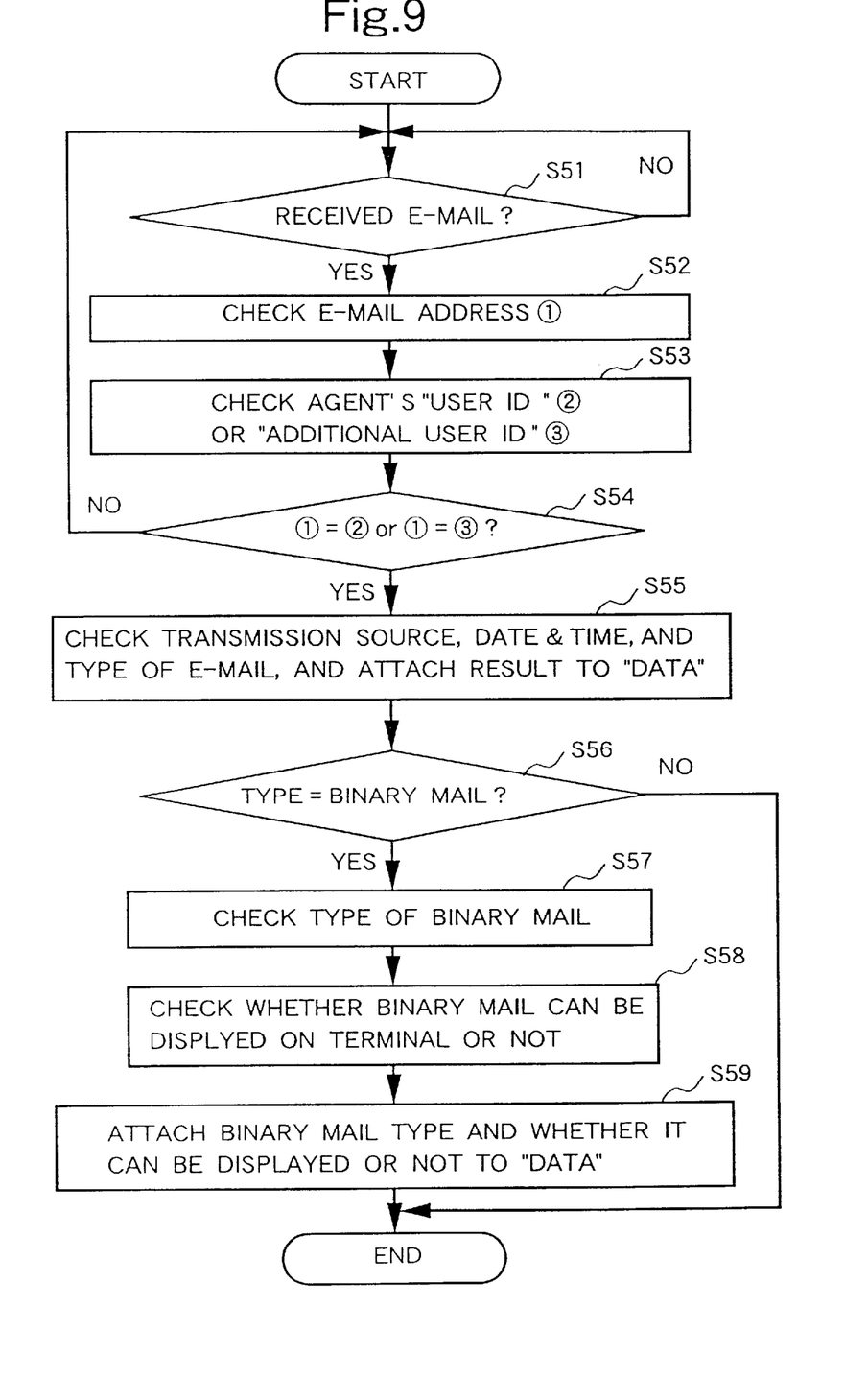
FIG. 9 is a flowchart showing process of E-mail reception notification agent of FIG. 1.

When the E-mail has arrived at the server system 21 or 22, E-mail reception notification agent 214 or 224 that is provided for each user of each server performs processing as shown in a flowchart of the FIG. 9. When the E-mail reception notification agent 214 or 224 finds E-mail at S51, the E-mail reception notification agent checks its mail address at S52. At S53, it checks to see whether it matches user ID 415 or additional user ID 417 of the E-mail reception notification agent 214 or 224. If the address matches the user ID 415 or the additional user ID 417, at S55, a source, date and time, and type of E-mail will be checked. When the E-mail was a binary mail, the type of binary mail is checked at S57, then at S58 checks to see if it matches with any type of binary mail in the procedure 419 of E-mail reception notification agent for a display at the terminal. A result of checking is attached to the data 420 of E-mail reception notification agent. After that, agent transmitting/receiving module 211 or 221 sends the E-mail reception notification agent to the terminal connection unit 2.

At the terminal connection unit 2, E-mail reception notification agent 214 or 224 waits until line between the terminal 1 and the terminal connection unit 2 is connected.

When the line between terminal 1 and terminal connection unit 2 is connected, agent transmitting/receiving module 9 sends E-mail reception notification agent 214 or 224 to the terminal 1, whereupon the reception of E-mail is notified.

Therefore, checking for the arrived E-mail to mail server from the terminal 1 can be done automatically when the connection is made between terminal 1 and connection unit 2, along with the information on source and type of binary mail. When E-mail reception notification agent 214 or 224 is sent to terminal connection unit 2, connection is not made between the terminal connection unit 2 and terminal 1, therefore traffic does not occur between terminal 1 and terminal connection unit 2 every time E-mail arrives. The amount of transmissions between terminal 1 and terminal connection unit 2 does not increase beyond necessity.

The data transmission system with improved safety is explained.

Figure 10:
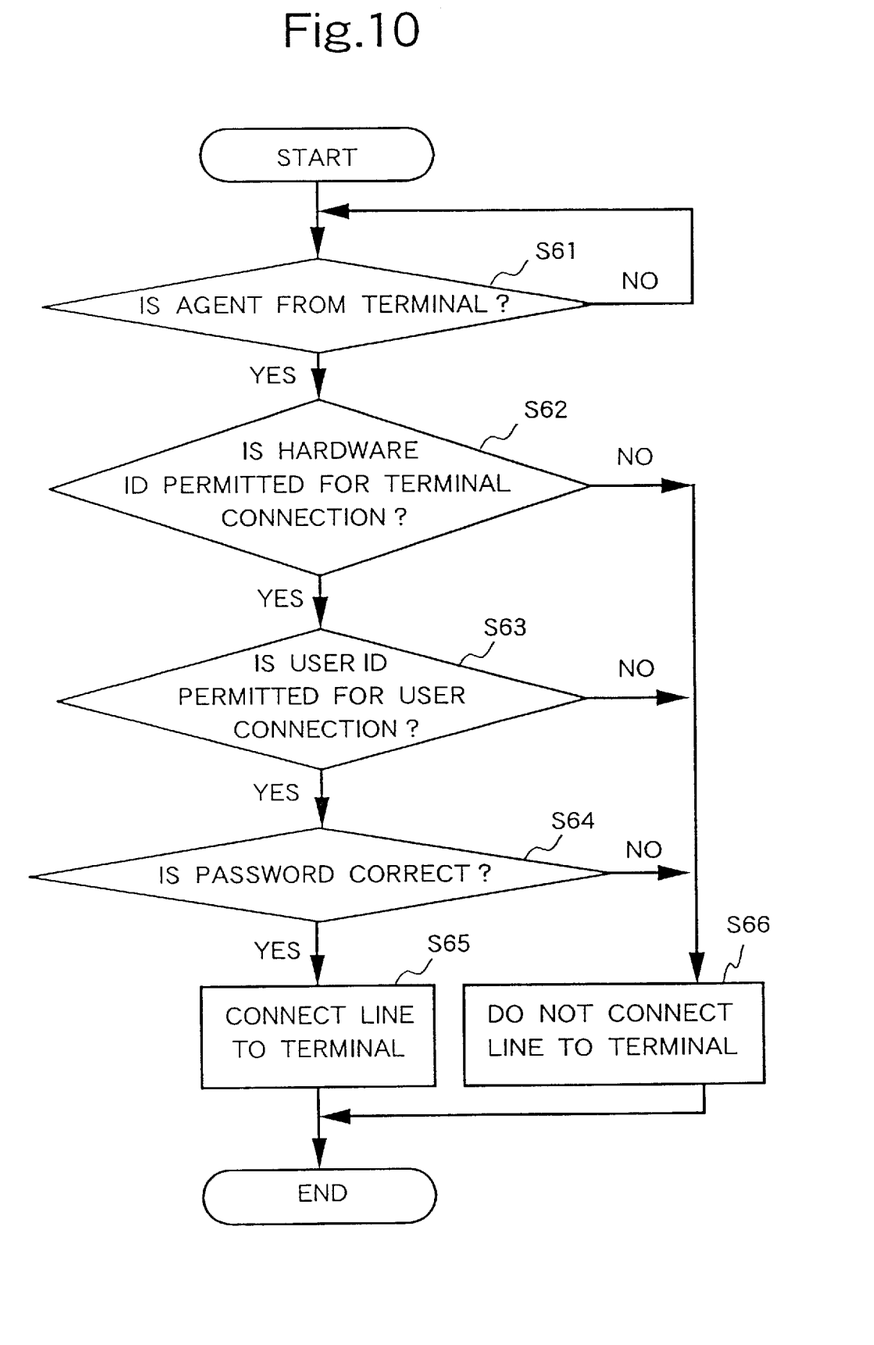
FIG. 10 is a flowchart of authorization process by the terminal authorization module of FIG. 1.

When retrieval agent 6 or E-mail receiving agent 7 is transferred from terminal 1 to terminal connection unit 2, a terminal authorization module 8 performs an authorization as shown in the flowchart of FIG. 10. At S62, the terminal authorization module checks for information on terminal hardware ID contained in the agent to see if the terminal 1 is permissible for connection to the terminal connection unit 2, that is, the terminal authorization module 8 checks to see if the terminal is a lost or a stolen one, being out of control making an unlawful access. If the terminal hardware ID was permissible for connection, the user ID and password will be checked at S63. If the user ID is the registered user ID permitted for connection, and if the password checked at S64 proves to be correct for the user ID, the line between terminal 1 and terminal connection unit 2 will be connected.

During the authorization process, if the terminal turns out to be impermissible for connection, or if the user ID turns out to be invalid for connection, or if the password is incorrect, the terminal connection unit 2 is not connected to the terminal 1.

In addition to the authorization of user ID and password, the terminal hardware ID will also be checked for authorization. This further prevents from unlawful access attempted using a stolen ID or password recovered from a lost or stolen terminal that are out of control, which could not have been avoided before with user ID and password, The system safety is improved and maintained.

The system with improved user operability is explained.

The terminal location information 413 obtained from GPS 5 will be added to retrieval agent 6 or E-mail retrieval agent 7 that are sent from the terminal 1, therefore, the user does not need to give input on location of the terminal. It is also possible to input and set location of the terminal to a memory (not shown in the Figure). A location information set module will be implemented by software and the memory.

In the configuration outlined in FIG. 1, radio terminal 1 is-equipped with GPS receiver 5, and terminal 1 sends the retrieval agent 6 after the adding the location information given from GPS receiver 5.

Figure 11:
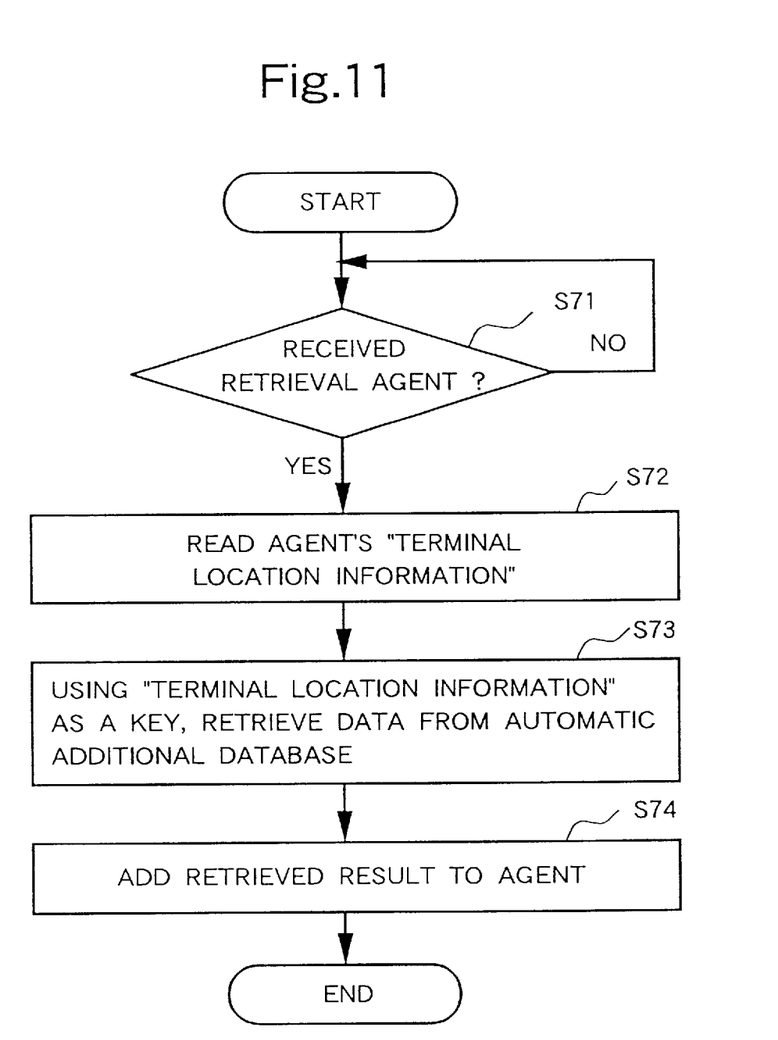
FIG. 11 is a flowchart showing processing by the server agent transmitting/receiving module when the retrieval agent obtains the location information.

For server systems 11 and 12 containing agent transmitting/receiving modules 111 and 121, when the retrieval agent 6 is received with attached information on location, the information on location is checked accordingly as in an algorithm of FIG. 11. First, at S72, the terminal location information 413 in the retrieval agent 6 is read. Next, at S73, from a defined data of the server system database, the databases 112 and 122 retrieve data that are related to location using the terminal location information 413 as a key. The retrieved result is attached to the retrieval agent at S74.

Not only to perform retrieval based on the retrieval conditions included in the retrieval agent 6, it can also pass on a restricted information related to location based on the position of terminal 1 to the retrieval agent 6.

To give an example, let's assume a user taking terminal 1 out of an office to, say, Kamakura-city in Kanagawa Prefecture. When the user retrieves a database, then the GPS sets the location information 413 "Kamakura-city, Kanagawa Prefecture" in retrieval agent 6. The retrieval agent 6 is received by the agent transmitting/receiving module of the server system, and along with its retrieved result the weather forecast in Kamakura, Kamakura area can be sent from the agent transmitting/receiving module to the retrieval agent 6. In this way, automatic location service related to information on location can be offered also.

Similarly, when retrieval agent 6 is received by the agent transmitting/receiving module 111 or 121 of the server system 11 or 12, a range of retrieval can be defined based on the retrieval conditions contained in retrieval agent 6, provided that the information is related to the location of terminal 1. For example, if terminal 1 is in Kanagawa Prefecture, the range of database retrieval would best be restricted to those information concerning Kanagawa Prefecture.

In order to restrict the users who can access server system 12 to only those who is moving into Saitama Prefecture, if the user's terminal location information 413 by GPS does not show any location information of Saitama Prefecture, the agent transmitting/receiving module 121 can refuse reception of the agent. In this way, it is possible to restrict users who are allowed to access the server system 12.

When retrieval agent 6 or E-mail receiving agent 7 is sent to terminal connection unit 2, the terminal authorization module 8 performs an authorization. If terminal authorization module 8 detects an unlawful access, it records the location information of the terminal 1 inside the retrieval agent 6 or the E-mail receiving agent 7. Conventionally, there was no way of knowing the whereabouts of the terminal making an access, not to mention the unlawful ones. By adding the location information from the GPS to the agent, and recording the location information in terminal authorization module 8 enables to pinpoint the unlawful terminal.

Thus, the information on location of terminal 1 can be obtained without specifying it from the terminal. Furthermore, the location information of terminal 1 allows for alteration or restriction of the retrieved range and/or retrieval operation of retrieval agent 6.

The results of operation are displayed on terminal 1 connected to terminal connection unit 2 via radio line 3. The user of terminal 1 is able to carry the terminal, as long as it is within the range of radio communication of terminal connection unit 2, giving the user the benefits of network agent system.

Although embodiment 1 is the configuration of two server systems for a database and two server systems for a mail server, however, a number of server systems, terminals and terminal connection units can arbitrarily be increased to obtain effects set forth in embodiment 1.

In the same manner, although only one additional user ID 417 could be set for agent 41 in embodiment 1, the agent can now have any number of additional user IDs without losing the same effects.

Furthermore, although the terminal and the terminal connection unit in embodiment 1 are connected via radio line, infra-red rays or other types of lines can also be utilized for the same effects.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. An information collection system equipped with transfer mechanism, comprising:
   a terminal connection unit including
      a terminal agent transmitting/receiving module for reading a specific area in an electronic message sent from a radio terminal via radio line or a wired terminal, and for transmitting the electronic message to one of specific servers specified in the electronic message as a circulating server; and a server including a server agent transmitting/receiving module for receiving the-electronic message from a terminal connection unit, transferring the electronic message to a processing module when a server is one of the circulating servers, for writing a processing result in the electronic message, and for transmitting the electronic message to a next one of circulating servers written in the electronic message, and the processing module for converting the transferred electronic message from the server agent transmitting/receiving module into a language used in the specified server and for processing a converted electronic message.

2. The information collection system equipped with transfer mechanism of claim 1, wherein the specific area in the electronic message includes a database retrieval request, wherein the processing module of the server includes a procedure language interpreting module unique to a database and the database retrieved in an interpreted language, and wherein the server writes a result of database retrieval in the electronic message and transmits the electronic message to the next one of circulating server.

3. The information collection system equipped with transfer mechanism of claim 1, wherein the specific area in the electronic message includes an E-mail reception transfer request, wherein fhe processing module of the server includes a procedure interpreting module for a mail server and the mail server for transmitting the E-mail specified in the interpreted electronic message, and wherein the server writes the E-mail in the electronic message and transmitting to the next one of circulating servers.

4. The information collection system equipped with transfer mechanism of claim 3, further comprising a binary mail display program providing server, to which the E-mail is sent in case when the server agent transmitting/receiving module judges the E-mail is the binary mail and is not the type that can be displayed on radio terminal, and wherein the binary mail display program providing server adds a corresponding binary mail display program to the electronic message and transmits to the next one of circulating servers.

5. The information collection system equipped with transfer mechanism of claim 3, wherein the server agent transmitting/receiving module, upon receiving the E-mail to the radio terminal of the server, sends the electronic message including an E-mail reception notification agent for notifying the reception to a corresponding terminal connection unit, and wherein the agent transmitting/receiving module of the terminal connection unit, upon receiving the electronic message including the E-mail reception notification agent, notifies the reception of a corresponding E-mail to the radio terminal when the line is connected with the radio terminal.

6. The information collection system equipped with transfer mechanism of claim 2, further comprising:

a radio terminal or a wired terminal including a location information detection module or a location information set module which adds the location information detected or set in the specific area of the electronic message, and wherein the server sets restricted conditions corresponding to the location information and performs processing determined by the location information received from the terminal.

* * * * *